(12) United States Patent
Andersen

(10) Patent No.: US 7,019,934 B1
(45) Date of Patent: Mar. 28, 2006

(54) OPTIMIZATION OF MEDIA PARAMETERS FOR ADVERSE OPERATING CONDITIONS

(75) Inventor: James W. Andersen, San Jose, CA (US)

(73) Assignee: Matsushita Electric Industrial Co. Ltd., Osaka (JP)

( * ) Notice: Subject to any disclaimer, the term of this patent is extended or adjusted under 35 U.S.C. 154(b) by 0 days.

(21) Appl. No.: 11/020,385

(22) Filed: Dec. 22, 2004

(51) Int. Cl.
   *G11B 21/02* (2006.01)
(52) U.S. Cl. ........................................ 360/75
(58) Field of Classification Search ............... None
   See application file for complete search history.

(56) References Cited

U.S. PATENT DOCUMENTS 6,445,524 B1 * 9/2002 Nazarian et al. ............. 360/49

* cited by examiner

*Primary Examiner*—David Hudspeth
*Assistant Examiner*—Mitchell Slavitt
(74) *Attorney, Agent, or Firm*—Fliesler Meyer (57) ABSTRACT

Embodiments of the present invention relate to systems, methods, and computer readable media for storing data on a rotatable storage medium. A hard drive having a rotatable storage medium is configured with different environmental tolerance characteristics for different sides of the rotatable storage medium. A first side is configured to have a higher tolerance to environmental factors such as shock and temperature by modifying features of the first side of the media and the read/write mechanism configured to interact with the first side. A second side of the storage medium is configured with lower environmental tolerances, thus allowing for higher performance. This configuration enables the hard drive to perform at a higher level of performance when facing less adverse environmental conditions while still remaining functional when facing more adverse environmental conditions.

24 Claims, 7 Drawing Sheets

OPTIMIZATION OF MEDIA PARAMETERS FOR ADVERSE OPERATING CONDITIONS

FIELD OF THE INVENTION

The present invention relates generally to configuring storage devices. The present invention relates more specifically to configuring environmental tolerances of storage devices.

BACKGROUND OF THE INVENTION

Over the past ten years, the mass production of storage devices has become both increasingly large in scale and increasingly competitive. The combination of aggressive computer upgrade schedules, increased storage demands driven by media applications, and the opening of foreign markets to computer sales has driven up the size and scale of storage device production. However, at the same time, increased competition has driven down the cost of computer components such as storage devices.

While once used primarily in personal and enterprise computers that were stored in fixed locations and moderate temperatures, hard drives are now appearing in a wide range of portable devices, such as laptop computers, personal data assistants, personal media players, and digital camcorders. Such applications often subject the hard drives to higher shock levels and more adverse temperatures than traditional applications. While it is possible to configure a hard drive to be more resilient to environmental effects, doing so can adversely affect performance. What is needed is a means for configuring hard drives for adverse environmental effects while still maintaining high performance.

DETAILED DESCRIPTION

Embodiments of the present invention relate to systems, methods, and computer readable media for storing data on a rotatable storage medium. A hard drive having a rotatable storage medium is configured with different environmental tolerance characteristics for different sides of the rotatable storage medium. A first side is configured to have a higher tolerance to environmental factors such as shock and temperature by modifying features of the first side of the media and the read/write mechanism configured to interact with the first side. A second side of the storage medium is configured with lower environmental tolerances, thus allowing for higher performance. This configuration enables the hard drive to perform at a higher level of performance when facing less adverse environmental conditions while still remaining functional when facing more adverse environmental conditions.

Figure 1:
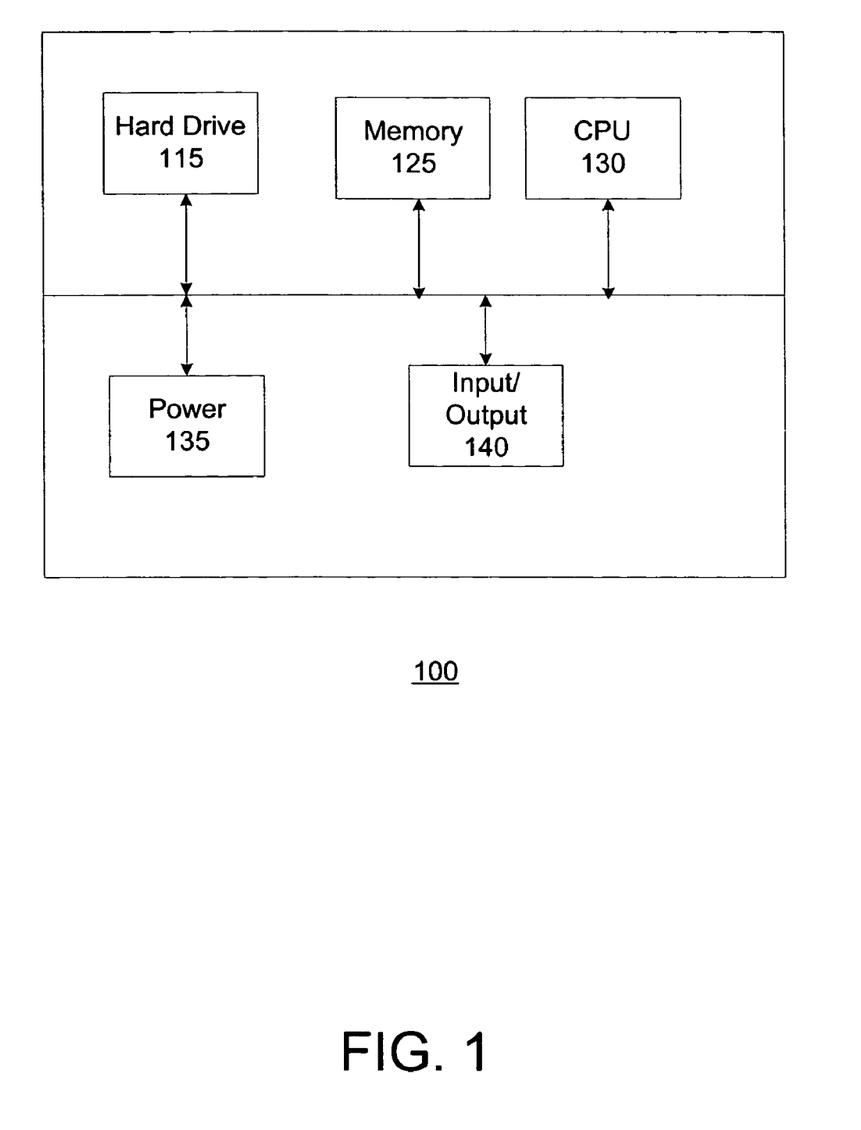
FIG. 1 is a block diagram illustrating a portable device.

FIG. 1 is a block diagram illustrating a portable device 100. The portable device can be a personal data assistant (PDA), a cellular phone, a personal media player (PMP), a laptop computer, or any other device which might include an embedded hard drive. The portable device includes a power supply 135 that provides power to the portable device 100. The power supply can be an Alternating Current (AC) adapter, a battery, or any other mechanism for providing power to the device. The portable device 100 also includes a memory 125. The memory 125 can be DRAM, SRAM, flash memory, or any other memory format. The memory 125 stores the operating instructions for the portable device, as well as data that is temporarily in use.

The portable device also includes an input/output 140. The input/output 140 collectively includes the devices that are used to provide input to and accept output from the portable device 100. The input/output 140 can include one or more Thin Film Transistor (TFT) or Liquid Crystal Display (LCD) displays, speakers, and sound outputs. The input/output 140 also includes devices for providing input to the portable device 100. These input devices can include a keyboard, mouse, touchpad, touchscreen, or any other device so equipped. The portable device 100 also includes a central processing unit (CPU) 130 that performs major calculations/operations for the portable device 100.

Furthermore, the portable device 100 includes a hard drive 115. The hard drive 115 is embedded in the portable device and stores data for use by the portable device 100.

Figure 2:
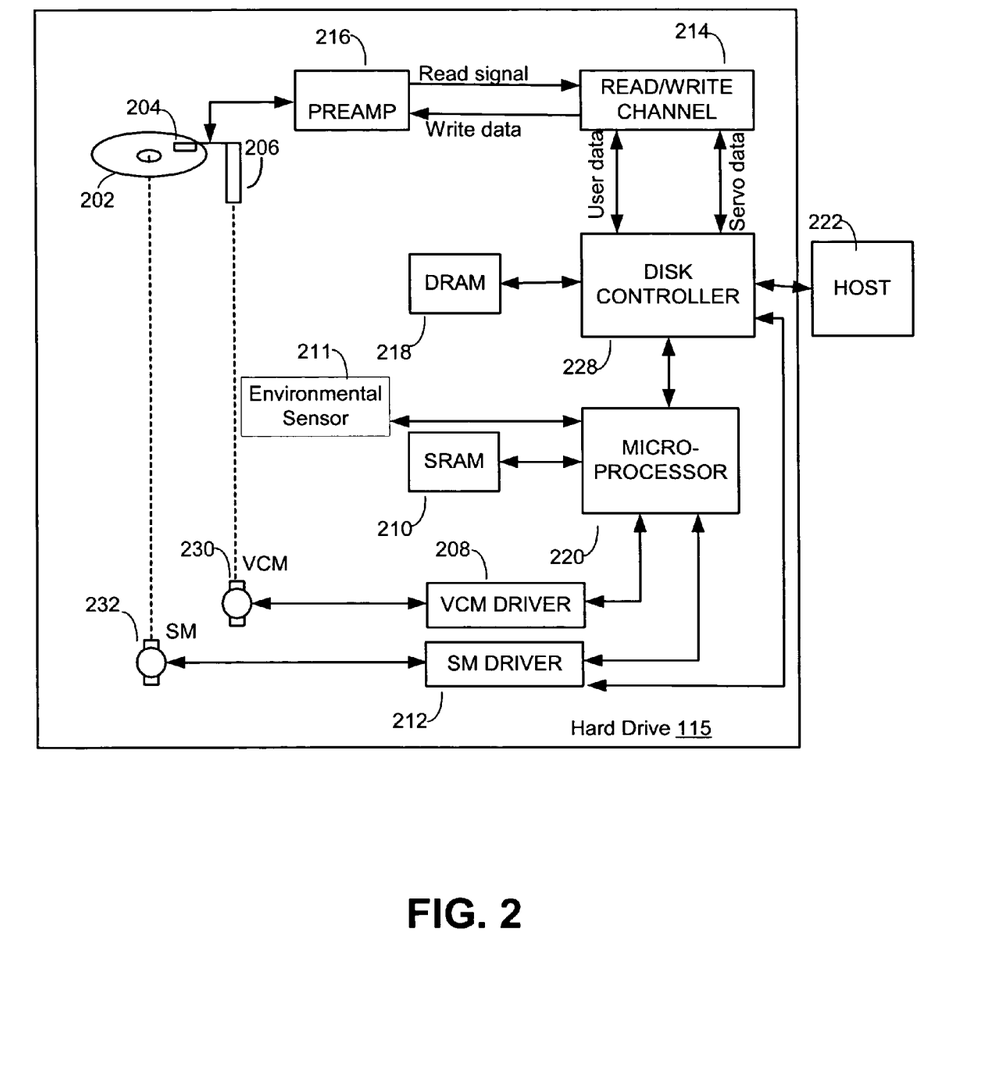
FIG. 2 is a more detailed view of a hard drive.

FIG. 2 shows a more detailed view of a storage device 115, which includes at least one rotatable storage medium 202 (i.e., disk) capable of storing information on at least one of its surfaces. In a magnetic disk drive as described below, the storage medium 202 is a magnetic disk. The numbers of disks and surfaces may vary from disk drive to disk drive. A closed loop servo system, including an actuator assembly 206, can be used to position a head 204 over selected tracks of the disk 202 for reading or writing, or to move the head 204 to a selected track during a seek operation. In one embodiment, the head 204 is a magnetic transducer adapted to read data from and write data to the disk 202. In another embodiment, the head 204 includes separate read and write elements. For example, the separate read element can be a magnetoresistive head, also known as an MR head. It will be understood that various head configurations may be used with embodiments of the present invention.

A servo system can include a voice coil motor driver 208 to drive a voice coil motor (VCM) 230 for rotation of the actuator assembly 206, a spindle motor driver 212 to drive a spindle motor 232 for rotation of the disk 202, a microprocessor 220 to control the VCM driver 208 and the spindle motor driver 212, and a disk controller 228 to accept information from a host 222 and to control many disk functions. The host 222 can be any device, apparatus, or system capable of utilizing the storage device 115, such as a personal computer or Web server. In one embodiment, the host 222 is the portable device 100. The disk controller 228 can include an interface controller in some embodiments for communicating with the host 222, and in other embodiments a separate interface controller can be used. Servo fields on the disk 202 are used for servo control to keep the head 204 on track and to assist with identifying proper locations on the disk 202 where data is written to or read from. When reading servo fields, the head 204 acts as a sensor that detects position information to provide feedback for proper positioning of the head 204 and for determination of the rotational position of the disk 202 via wedge numbers or other position identifiers.

The microprocessor 220 can also include a servo system controller, which can exist as circuitry within the drive or as an algorithm resident in the microprocessor 220, or as a combination thereof. In other embodiments, an independent servo controller can be used. Additionally, the microprocessor 220 may include some amount of memory such as SRAM, or an external memory such as SRAM 210 can be coupled with the microprocessor 220. The disk controller 228 can also provide user data to a read/write channel 214, which can send signals to a current amplifier or preamp 216 to be written to the disk 202, and can send servo signals to the microprocessor 220. The disk controller 228 can also include a memory controller to interface with memory 218. Memory 218 can be DRAM, which in some embodiments, can be used as a buffer memory. In alternate embodiments, it is possible for the buffer memory to be implemented in the SRAM 210.

Although shown as separate components, the VCM driver 208 and spindle motor driver 212 can be combined into a single "hard disk power-chip." It is also possible to include the spindle control circuitry in that chip. The microprocessor 220 is shown as a single unit directly communicating with the VCM driver 208, although a separate VCM controller processor (not shown) may be used in conjunction with processor 220 to control the VCM driver 208. Further, the processor 220 can directly control the spindle motor driver 212, as shown. Alternatively, a separate spindle motor controller processor (not shown) can be used in conjunction with microprocessor 220.

The hard drive 115 additionally included an environmental sensor 211. The environmental sensor 211 collects temperature and shock information that is used to manage the response of the hard drive 115 to adverse environmental conditions.

Figure 3:
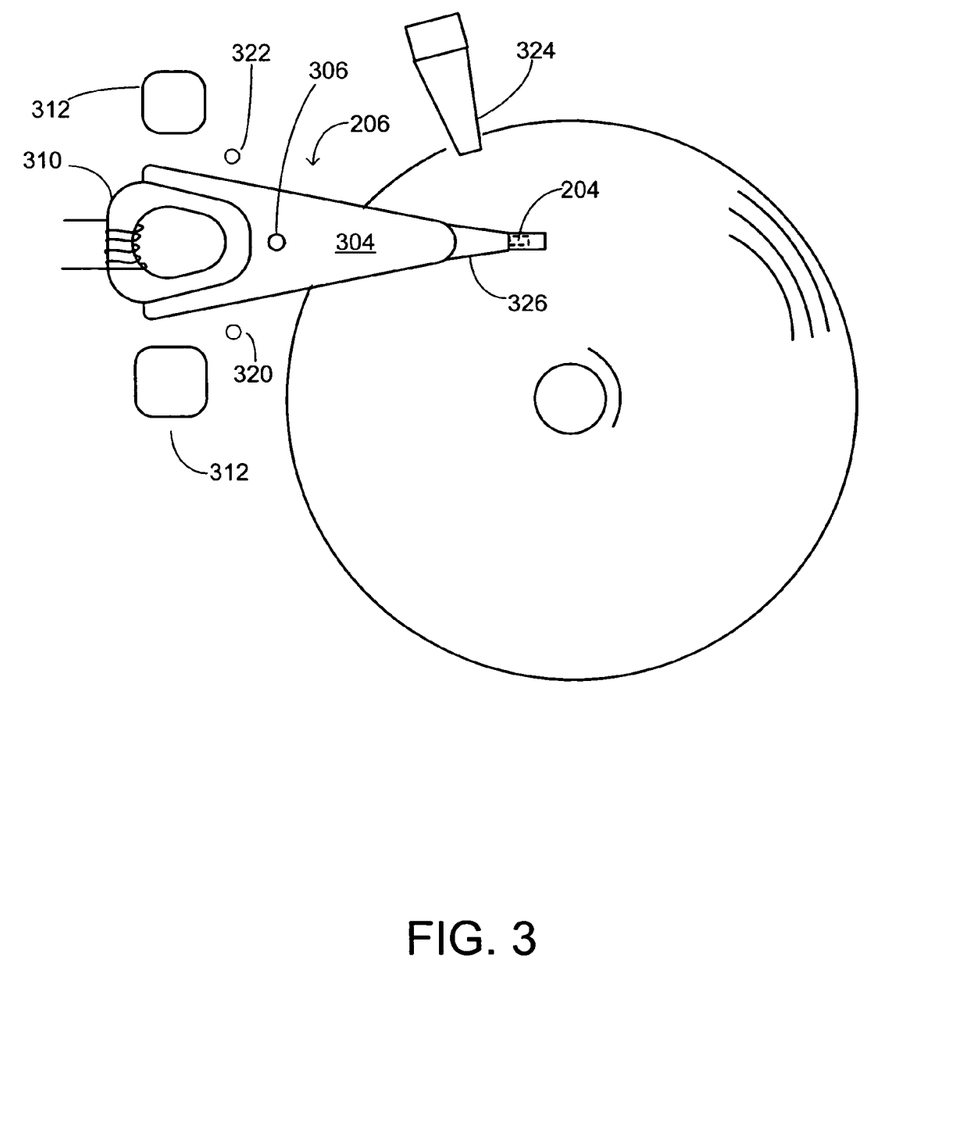
FIG. 3 is a diagram illustrating a more detailed view of an actuator assembly.

FIG. 3 shows some additional details of the actuator assembly 206. The actuator assembly 206 includes an actuator arm 304 that is positioned proximate the disk 202, and pivots about a pivot point 306 (e.g., which may be an actuator shaft). Attached to the actuator arm 304 is the read/write head 204, which can include one or more transducers for reading data from and writing data to a magnetic medium, an optical head for exchanging data with an optical medium, or another suitable read/write device. Also, attached to the actuator arm 306 is an actuator coil 310, which is also known as a voice coil or a voice actuator coil.

The voice coil 310 moves relative to one or more magnets 312 (only partially shown) when current flows through the voice coil 310. The magnets 312 and the actuator coil 310 are parts of the voice coil motor (VCM) 230, which applies a force to the actuator arm 304 to rotate it about the pivot point 306. The actuator arm 304 includes a flexible suspension member 326 (also known simply as a suspension). At the end of the suspension 326 is a mounted slider (not specifically shown) with the read/write head 204.

The VCM driver 208, under the control of the microprocessor 220 (or a dedicated VCM controller, not shown) guides the actuator arm 304 to position the read/write head 204 over a desired track, and moves the actuator arm 304 up and down a load/unload ramp 324. A latch (not shown) will typically hold the actuator arm 304 when in the parked position. The drive 200 also includes crash stops 320 and 322. Additional components, such as a disk drive housing, bearings, etc. which have not been shown for ease of illustration, can be provided by commercially available components, or components whose construction would be apparent to one of ordinary skill in the art reading this disclosure.

The actuator assembly sweeps an arc between the inner and outer diameters of the disk 202, that combined with the rotation of the disk 202 allows a read/write head 204 to access approximately an entire surface of the disk 202. The head 204 reads and/or writes data to the disks 202, and thus, can be said to be in communication with a disk 202 when reading or writing to the disk 202. Each side of each disk 202 can have an associated head 204, and the heads 204 are collectively arranged within the actuator assembly such that the heads 204 pivot in unison. In alternate embodiments, the heads can pivot independently. The spinning of the disk 202 creates air pressure beneath the slider to form a micro-gap of typically less than one micro-inch between the disk 202 and the head 204.

Figure 4:
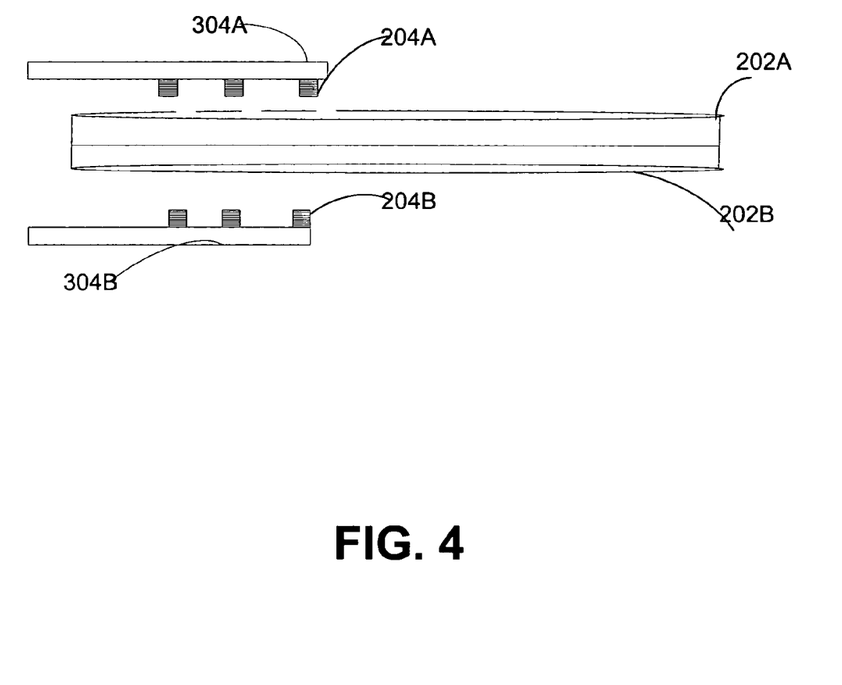
FIG. 4 is a side view of a disk that has been optimized for adverse conditions.

FIG. 4 is a side view of a disk that has been optimized for adverse conditions. The disk 202 is divided into its top-surface 202A and bottom surface 202B. The top surface 202A and bottom surface 202B have been designed with different magnetic response characteristics. The top surface 202A is designed with a higher tolerance for adverse environmental conditions (e.g. a lower media coercivity, lower data density) whereas the lower surface 202B is designed for higher performance levels. In one embodiments, the disk 202 is created by taking two disks, preparing each disk with different performance characteristics, and binding the two disks together.

In addition, to the disks 202, the actuator arms 304A, 304B and read/write heads 204A, 204B associated with each side are configured with different characteristics, with the elements 304A, 204A used for writing to top half of the storage device configured for higher tolerance of adverse conditions and the elements 304B, 204B configured for higher performance.

The top actuator arm 304A is configured with a higher flying height, thus allowing for greater tolerance to shocks and temperatures. The lower actuator arm 304B is configured for a lower flying height, which enables the lower actuator arm to write at higher data rates. In one embodiment, the top actuator arm 304A and the lower actuator arm 304B are separately actuated, so that that they can move independently of each other. In this embodiment, the lower arm 304B is not subjected to the risk of damage when the top arm 304A is moved when writing during adverse conditions. In alternate embodiments, the two arms 304A and 304B are controlled by a single actuator mechanism, so that when one is moved, the other is moved.

The upper read/write head 204A is configured with a wider read head and write head. The wider heads are more resistant to shock and other forms of damage. However, because of the larger spacing, data written to the disk 202A must be written in a less dense format, and thus cannot be read as quickly. The lower read/write head 202B is configured with narrower spacing, thus allowing for higher performance.

Figure 5:
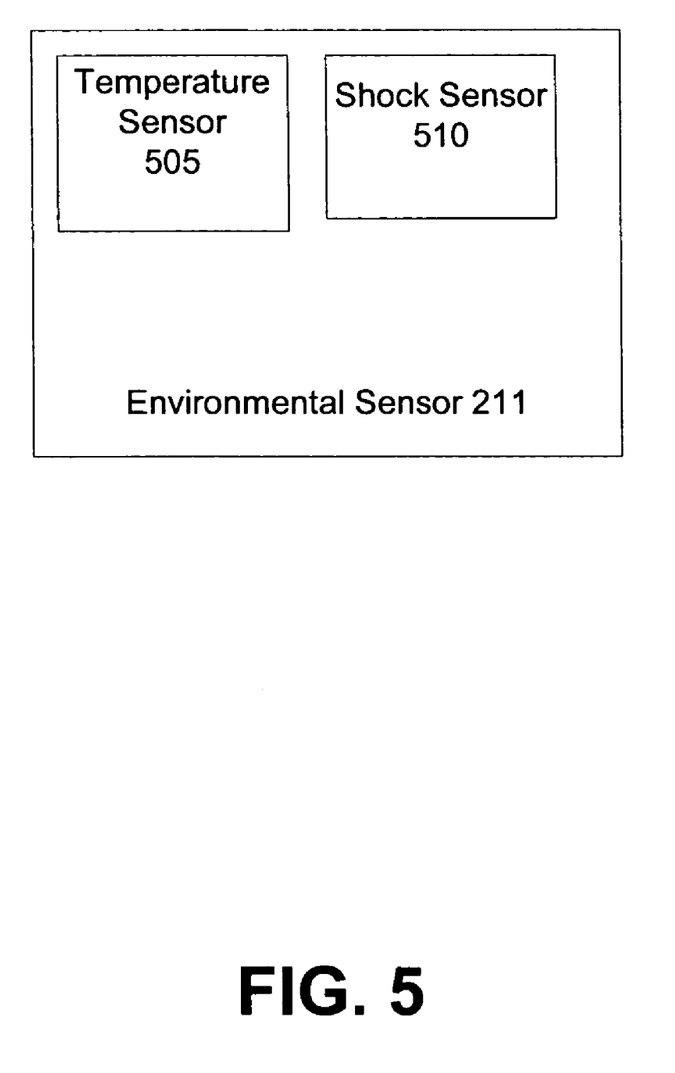
FIG. 5 is a more detailed view of an environmental sensor.

FIG. 5 is a more detailed view of an environmental sensor. The environmental sensor 211 includes a temperature sensor 505 and a shock sensor 510. The temperature sensor 505 is configured to measure a temperature within the portable device 100 for the purpose of detecting temperatures that can adversely affect write operations. In some embodiments, the temperature sensor is connected to an external sensor that detects the temperature outside the portable device 100.

The shock sensor 510 detects shocks and vibrations that can potentially damage the hard drive 115. The shock sensor 610 measures both the magnitude and frequency (regularity) of the shocks. In one embodiment, the shock sensor generates an amalgamated value from the magnitude and frequency indicating an overall shock profile.

Figure 6:
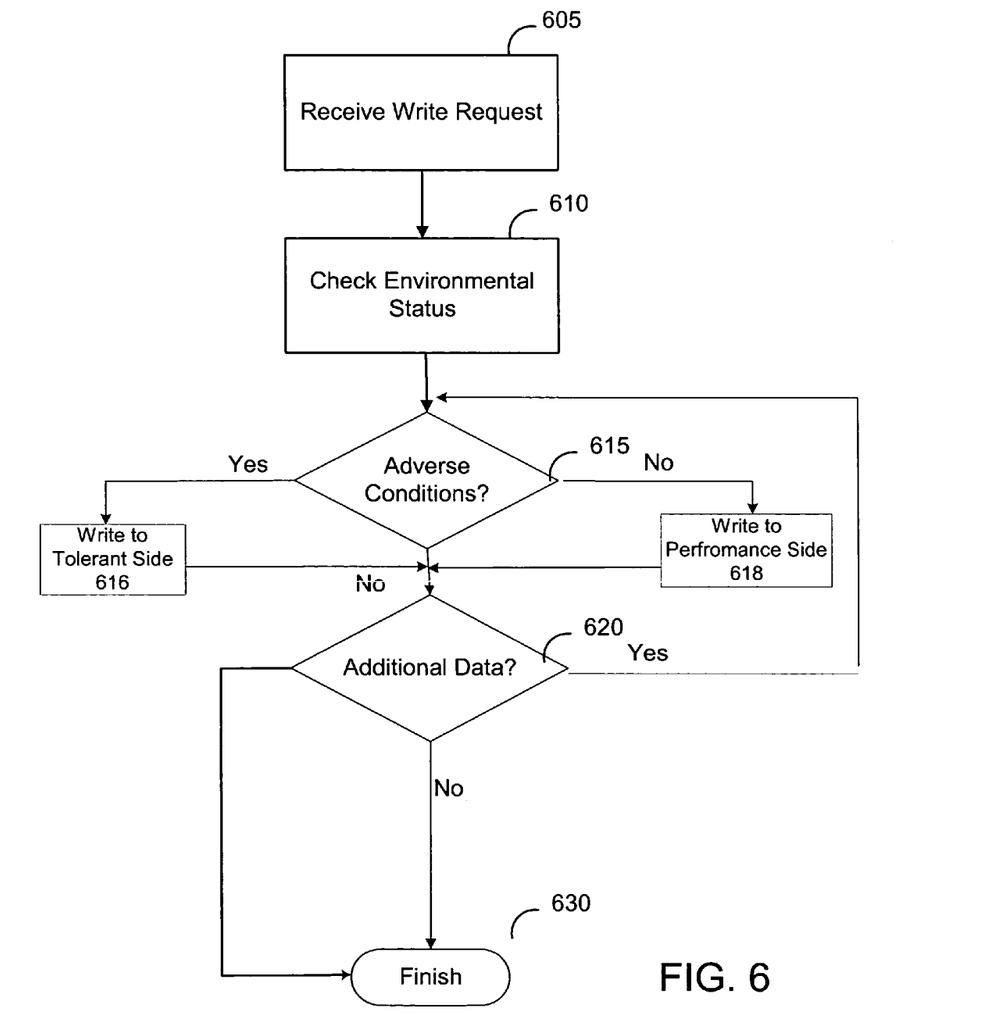
FIG. 6 is a flow chart illustrating one embodiment of a process for operating a hard drive.

FIG. 6 is a flow chart illustrating one embodiment of a process for operating a hard drive. The process below can be performed by the processor 220, the controller 228, or a specialized device within the hard drive 115. In step 605, a request to write data is received. In response to the request, the hard drive 105, in step 610 checks the environmental status by utilizing the environmental sensor 211. In step 615, the hard drive determines whether adverse conditions are present. The substeps associated with steps 610 and 615 are described in greater detail with respect to FIG. 7. While in the present embodiment this determination is performed in response to a specific write request, in alternate embodiments, it can occur independently of a specific write request.

If adverse conditions are present, in step 617 the hard drive writes to the side of the hard drive that is more tolerant of adverse environmental conditions (e.g. the top side). If adverse conditions are not present, in step 618 the hard drive writes to the side that is configured for higher performance. With regards to step 617 and 618, the hard drive writes for a preconfigured period of time. This period of time can be user-configurable or set during manufacturing. In step 620, the hard drive determines if extra data associated with the write request remains to be written. If additional data remains, the process returns to step 615. If no additional data remains, the process finishes in step 630.

Figure 7:
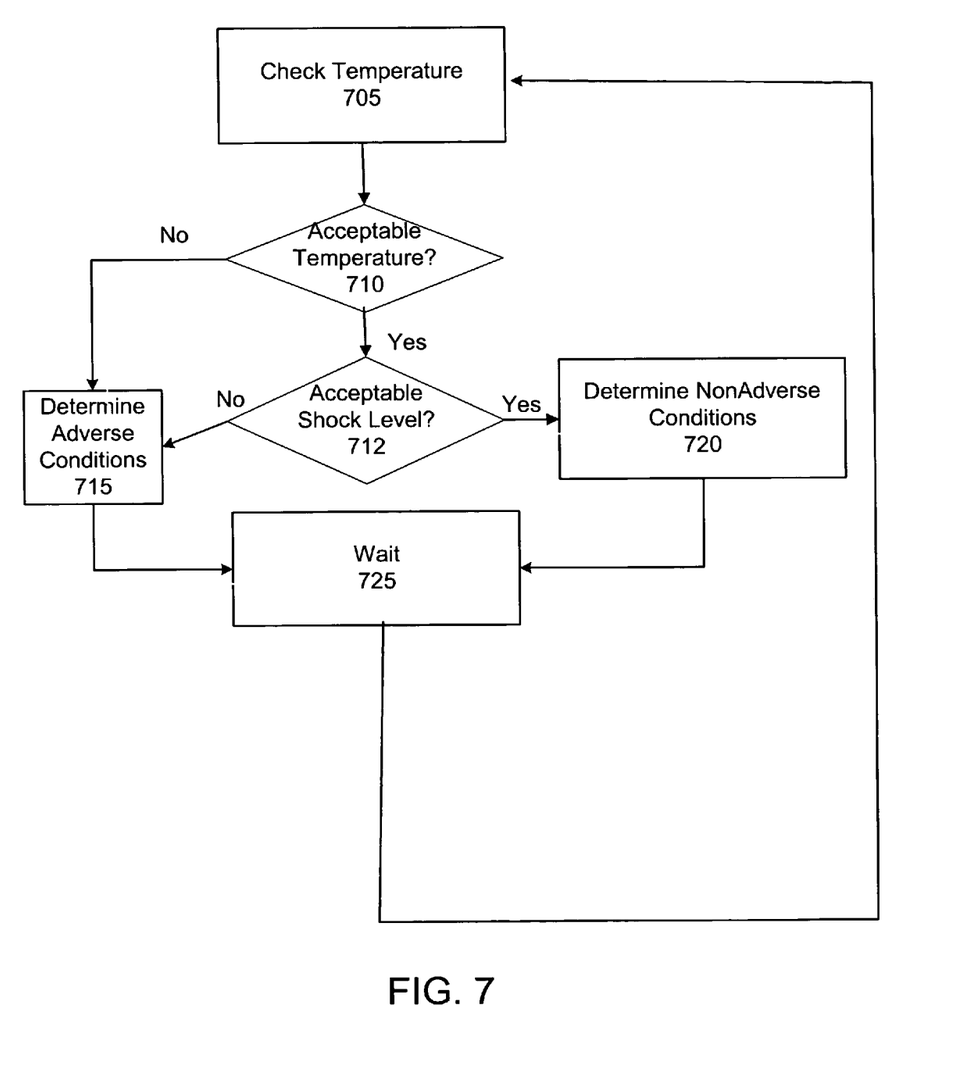
FIG. 7 is a flow chart illustrating one embodiment of a process for determining whether adverse environmental conditions are present.

FIG. 7 is a flow chart illustrating one embodiment of a process for determining whether adverse environmental conditions are present. In step 705, the hard drive 105 utilizes the environmental sensor 211 to check the temperature. The temperature in question can be a temperature internal to the hard drive, internal to the portable device 100, external to portable device, or any other relevant temperature. In step 710, the hard drive 105 determines whether the temperature is acceptable (i.e. indicative of adverse conditions). In some embodiments, there are maximum and minimum acceptable temperatures that can be user-designated or manufacturer-designated. If the temperature is not acceptable, in step 715, the hard drive determines that adverse conditions are present. After determining that adverse conditions are present, the hard drive moves to step 725, where it waits a predetermined period of time and then repeats step 705.

If the temperature is acceptable, the hard drive 105, in step 712 determines if the shock level is acceptable. In one embodiment, any shocks above a certain magnitude, within a fixed period of time before the checking step, causes the hard drive to determine that the shock level is too high. In alternate embodiments, the hard drive generates a shock profile value that includes the magnitude and frequency of the shocks and if the shock profile value is higher than a predetermined amount, the hard drive determines that the shock level isn't acceptable. If the hard drive 105 determines that the shock value isn't acceptable, the hard drive moves to step 715 and determines that adverse conditions are present. If the hard drive 105 determines that the shock level is acceptable, it determines in step 720, that no adverse conditions are present. After step 720, the hard drive moves to the wait cycle in step 725. While in the present embodiment, the hard drive 105 only tests for shock and temperature conditions, in alternate embodiments, it can be configured to test for other adverse environmental conditions.

Other features, aspects and objects of the invention can be obtained from a review of the figures and claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention.

What is claimed is:

1. A method of writing for a hard drive, the hard drive having a rotatable storage medium, the rotatable storage medium having a first side and a second side, the hard drive having superior tolerances for adverse environmental conditions when writing to the first side as compared to the second side, the method comprising:

detecting whether an environmental condition exceeds a threshold tolerance; and     writing to the first side of the rotatable storage medium when the environmental condition exceeds the threshold tolerance so as to utilize the superior environmental tolerances when writing to the first side as compared to the second side.

2. The method of claim 1, further comprising writing to the second side of the rotatable storage medium when the environmental condition does not exceed the threshold tolerance.

3. The method of claim 1, wherein the environmental condition comprises a low temperature and the threshold amount comprises a minimum temperature.

4. The method of claim 1, wherein the environmental condition comprises a magnitude of external shocks and the threshold amount comprises a maximum magnitude of external shocks.

5. The method of claim 1, wherein the environmental condition comprises a frequency of external shocks and the threshold amount comprises a maximum frequency of external shocks.

6. The method of claim 1, wherein the first side of the rotatable storage medium includes a lower media coercivity than the second side.

7. The method of claim 1, wherein the first side of the rotatable storage medium includes a lower data density than the second side.

8. A method for configuring a storage device including a rotatable storage medium, the method comprising:
    configuring a first side of the rotatable storage medium with a first tolerance for adverse environmental conditions; and
    configuring a second side of the rotatable storage medium with a second tolerance for adverse environmental conditions, wherein the first tolerance is superior to the second tolerance.

9. The method of claim 8, wherein the adverse environmental conditions include temperatures below a threshold amount.

10. The method of claim 8, wherein the adverse environmental conditions include a shock magnitude above a maximum amount.

11. The method of claim 8, wherein configuring the first side of the storage medium includes configuring a read/write mechanism associated with the first side.

12. The method of claim 8, wherein configuring the second side of the storage medium comprises configuring a read/write mechanism associated with the second side.

13. The method of claim 8, further comprising configuring the storage device to:
    detect whether an environmental condition exceeds a threshold tolerance; and
    write to the first side of the rotatable storage medium when the environmental condition exceeds the threshold tolerance.

14. The method of claim 8, wherein configuring the first side comprises configuring the first side with a lower media coercivity than the second side.

15. The method of claim 8, wherein configuring the first side comprises configuring the first side with a lower data density than the second side.

16. A rotatable storage medium comprising:
    a first side having a first set of configurations configured to enable writing to the first side with a higher tolerance to adverse environmental conditions; and
    a second side having a second set of configurations configured to enable writing to the second side of the storage medium with a lower tolerance to adverse environmental conditions.

17. The rotatable storage medium of claim 16, wherein the first side of the rotatable storage medium includes a lower media coercivity than the second side.

18. The rotatable storage medium of claim 16, wherein the first side of the rotatable storage medium includes a lower data density than the second side.

19. The rotatable storage medium of claim 16, wherein the adverse environmental conditions comprise temperatures below a threshold amount.

20. The rotatable storage medium of claim 16, wherein the adverse environmental conditions comprise shocks having a magnitude above a threshold amount.

21. The rotatable storage medium of claim 16, wherein the adverse environmental conditions comprise shocks having a frequency above a threshold amount.

22. The rotatable storage medium of claim 16, wherein the first side of the rotatable storage medium includes a lower media coercivity than the second side, thus enabling a higher tolerance for adverse temperatures.

23. The rotatable storage medium of claim 16, wherein the first side of the rotatable storage medium includes a lower data density than the second side, thus enabling a higher tolerance for adverse temperatures.

24. A control system for a hard drive having a rotatable storage medium, the rotatable storage medium having a first side and a second side, the hard drive having superior tolerances for adverse environmental conditions when writing to the first side, the control system comprising:
    a detection system configured to detect whether an environmental condition exceeds a threshold tolerance; and
    a selection system configured to direct the hard drive to write to the first side of the rotatable storage medium when the environmental condition exceeds the threshold tolerance so as to utilize the superior environmental tolerances when writing to the first side as compared to the second side.

* * * * *